United States Patent
Slocum

(10) Patent No.: US 11,629,396 B2
(45) Date of Patent: *Apr. 18, 2023

(54) ACTIVATED ALUMINUM FUEL

(71) Applicant: LTAG SYSTEMS LLC, Bow, NH (US)

(72) Inventor: Jonathan T. Slocum, Bow, NH (US)

(73) Assignee: LTAG SYSTEMS LLC, Bow, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/134,757

(22) Filed: Dec. 28, 2020

(65) Prior Publication Data

US 2021/0115547 A1  Apr. 22, 2021

Related U.S. Application Data

(63) Continuation of application No. 16/804,643, filed on Feb. 28, 2020, which is a continuation of application
(Continued)

(51) Int. Cl.
| | |
|---|---|
| *C23C 2/02* | (2006.01) |
| *C23C 2/04* | (2006.01) |
| *C23C 2/14* | (2006.01) |
| *H01M 8/065* | (2016.01) |
| *H01M 8/04082* | (2016.01) |

(52) U.S. Cl.
CPC .................. *C23C 2/02* (2013.01); *C23C 2/04* (2013.01); *C23C 2/14* (2013.01); *H01M 8/04216* (2013.01); *H01M 8/065* (2013.01)

(58) Field of Classification Search
CPC .................................. C01B 3/08; C23C 2/02
See application file for complete search history.

(56) References Cited

U.S. PATENT DOCUMENTS

| | | | |
|---|---|---|---|
| 3,204,320 A | 9/1965 | Eckstein et al. | |
| 3,878,081 A | 4/1975 | Reding et al. | |
| (Continued) | | | |

FOREIGN PATENT DOCUMENTS

| | | | |
|---|---|---|---|
| CN | 109678109 A | 4/2019 | |
| RU | 2131841 C1 | 6/1999 | |
| (Continued) | | | |

OTHER PUBLICATIONS

Metals Handbook Tenth Edition, "vol. 2, Properties and Selection: Nonferrous Alloys and Special-Purpose Materials", Oct. 1990, pp. 145-146.
(Continued)

*Primary Examiner* — Christopher S Kessler
(74) *Attorney, Agent, or Firm* — The Marbury Law Group, PLLC

(57) ABSTRACT

Aluminum can be used as a fuel source when reacted with water if its native surrounding oxide coating is penetrated with a gallium-based eutectic. When discrete aluminum objects are treated in a heated bath of eutectic, the eutectic penetrates the oxide coating. After the aluminum objects are treated, the aluminum objects can be reacted in a reactor to produce hydrogen which can, for example, react with oxygen in a fuel cell to produce electricity, for use in a variety of applications.

18 Claims, 7 Drawing Sheets

Related U.S. Application Data

No. 15/171,053, filed on Jun. 2, 2016, now Pat. No. 10,745,789.

(60) Provisional application No. 62/169,734, filed on Jun. 2, 2015.

(56) References Cited

U.S. PATENT DOCUMENTS

| | | | |
|---|---|---|---|
| 3,993,595 | A | 11/1976 | Merkl |
| 4,358,291 | A | 11/1982 | Cuomo et al. |
| 4,770,848 | A | 9/1988 | Ghosh et al. |
| 5,494,538 | A | 2/1996 | Kirillov et al. |
| 5,620,652 | A | 4/1997 | Tack et al. |
| 5,707,499 | A | 1/1998 | Joshi et al. |
| 6,506,360 | B1 | 1/2003 | Andersen et al. |
| 7,803,349 | B1 | 9/2010 | Muradov |
| 8,418,435 | B2 | 4/2013 | Hatoum |
| 9,624,103 | B1 | 4/2017 | Woodall et al. |
| 10,745,789 | B2 | 8/2020 | Slocum |
| 2002/0088178 | A1* | 7/2002 | Davis ............ B01J 19/22 48/61 |
| 2003/0024323 | A1 | 2/2003 | Wang et al. |
| 2008/0063597 | A1 | 3/2008 | Woodall et al. |
| 2008/0193806 | A1 | 8/2008 | Kulakov |
| 2009/0208404 | A1 | 8/2009 | Itoh |
| 2010/0028255 | A1 | 2/2010 | Hatoum |
| 2010/0061923 | A1 | 3/2010 | Reddy |
| 2012/0052001 | A1 | 3/2012 | Woodall et al. |
| 2012/0107228 | A1* | 5/2012 | Ishida ............ C22C 12/00 423/658 |
| 2012/0318660 | A1 | 12/2012 | Cohly et al. |
| 2014/0231281 | A1 | 8/2014 | Young et al. |
| 2014/0231132 | A1 | 9/2014 | Zeren et al. |
| 2016/0355918 | A1 | 12/2016 | Slocum |
| 2019/0024216 | A1 | 1/2019 | Giri et al. |
| 2019/0341637 | A1 | 11/2019 | Fine et al. |
| 2020/0199727 | A1 | 6/2020 | Slocum |
| 2020/0199728 | A1 | 6/2020 | Slocum |

FOREIGN PATENT DOCUMENTS

| | | |
|---|---|---|
| WO | 2009/034479 A2 | 3/2009 |
| WO | 2015005921 A1 | 1/2015 |
| WO | 20150077225 A1 | 5/2015 |
| WO | 2016196718 A1 | 12/2016 |

OTHER PUBLICATIONS

Rajagopalan, M. et al., "Atomic-scale analysis of liquid-gallium embrittlement of aluminum grain boundaries", Acta Materialia, vol. 73 Jul. 2014, pp. 312-325.

Choi, Go et al., "Mechanism of Hydrogen Generation via Water Reaction with Aluminum Alloys", Generating hydrogen on demand Jun. 28, 2010, 4 pages.

Parmuzina, A.V. et al., "Oxidation of activated aluminum with water as a method for hydogen generation", Russian Chemical Bulletin, International Edition, vol. 58, No. 3 Mar. 2009, pp. 493-989.

Vitos, L. et al., "The Surface Energy of Metals", Elsevier Surface Science 411, 1998, pp. 186-202.

"Fundamentals of Adhesion edited by Lieng-Huang Lee", Xerox Corporation, 1991, pp. 333-336.

Ansara, I. et al., "Thermodynamic Analysis of the Ga—In, Al—Ga, Al—In and the Al—Ga—In Systems", Calphad vol. 2, No. 3 1978, pp. 187-196.

EPO, "EP Application Serial No. 16804381.8, Extended European Search Report dated Oct. 26, 2018", 7 pages.

WIPO, "PCT Application No. PCT/US16/35397, International Preliminary Reporton Patentability dated Dec. 5, 2017", 11 pages.

ISA, "PCT Application No. PCT/US16/35397, International Search Report and Written Opinion dated Sep. 7, 2016", 13 pages.

B. Wan et al., "Review of solid state recycling of aluminum chips", Elsevier, Resources, Conservation & Recycling 125 (2017) pp. 37-47.

Chao et al., "Mazimized On-Demand Hydrogen Genertor Design", Adv. Mat.Res. V 690-693. pp 954-961 (2013).

U.S. Appl. No. 17/351,079, Non-Final Office Action dated Nov. 8, 2021, 24 pages.

U.S. Appl. No. 16/804,643, Non-Final Office Action dated Apr. 15, 2021; 22 pages.

U.S. Appl. No. 16/804,676 Non-Final Office Action dated Jul. 21, 2021, 17 pages.

PCT International Search Report and Written Opinion of the International Searching Authority; International Application No. PCT/US2021/037948; dated Nov. 5, 2021; 28 pages.

U.S. Appl. No. 17/499,264; Non-Final Office Action dated Dec. 9, 2021; 25 pages.

U.S. Appl. No. 16/804,676, Notice of Allowance dated Jan. 25, 2022; 25 pages.

U.S. Appl. No. 17/351,079; Notice of Allowance dated Apr. 5, 2022; 25 pages.

U.S. Patent and Trademark Office, "Non-Final Office Action," issued in related U.S. Appl. No. 17/499,264 dated Jul. 14, 2022 (17 pages).

* cited by examiner

ACTIVATED ALUMINUM FUEL

CROSS-REFERENCE TO RELATED APPLICATIONS

This application is a continuation of U.S. patent application Ser. No. 16/804,643, filed Feb. 28, 2020, which is a continuation of U.S. patent application Ser. No. 15/171,053, filed Jun. 2, 2016 (now issued as U.S. Pat. No. 10,745,789 B2), which claims the benefit of priority of U.S. Provisional Patent Application No. 62/169,734, filed on Jun. 2, 2015, with entire contents of each of these applications hereby incorporated herein by reference.

BACKGROUND

Aluminum has a high energy density (83.8 MJ/L) relative to other metals and has more than twice the energy density of gasoline (38 MJ/L). Aluminum is also highly reactive with oxidizing agents, making it a useful source of hydrogen. For example, when aluminum is brought into contact with water, hydrogen is generated through the following reaction:

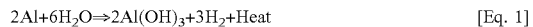

$$2Al + 6H_2O \rightarrow 2Al(OH)_3 + 3H_2 + \text{Heat} \qquad [\text{Eq. 1}]$$

Thus, aluminum has the potential to be a safe source of hydrogen. Under normal environmental conditions, however, a protective oxide coating forms on aluminum. This oxide coating forms rapidly and is stable, creating an obstacle to the production of useful amounts of hydrogen and heat from the exposure of aluminum to water.

SUMMARY

An activated aluminum fuel of the present disclosure is a stable and high-yielding hydrogen fuel source and, as such, is amenable to use in a variety of hydrogen-based applications in which size, weight, portability, and availability of hydrogen are critical mission factors. For example, the activated aluminum fuel can be stored in a low humidity environment, safely transported to a point of hydrogen demand, and reacted with water at the point of demand to produce hydrogen for use in power generation (e.g., in a hydrogen-powered fuel cell), reducing the risk and complexity otherwise associated with the use of hydrogen as a fuel.

In one aspect, a method of fabricating a hydrogen fuel source includes exposing the aluminum object (e.g., a sphere) to a eutectic alloy including indium and gallium, diffusing the eutectic alloy from an outer surface of the aluminum object into a volume of the aluminum object, and recovering at least a portion of the eutectic alloy from the aluminum oxide layer on the outer surface of the aluminum object. The eutectic alloy is diffused through disruptions in the aluminum oxide layer. As used herein, the term "disruptions" is inclusive of, for example, micro-cracks and nucleation sites.

In some embodiments, the method further includes creating the disruptions in the aluminum oxide layer on the outer surface of the aluminum object. For example, creating the disruptions in the aluminum oxide layer on the outer surface of the aluminum object can include thermally expanding the aluminum object (e.g., to create mechanical stress in excess of the tensile yield stress of the aluminum oxide layer). Thermally expanding the aluminum object can include placing the aluminum object into a bath of the eutectic alloy heated to greater than about 75 degrees greater than an initial temperature of the aluminum object.

In certain embodiments, exposing the aluminum object to the eutectic alloy includes exposing the aluminum object to the eutectic alloy includes immersing the aluminum object in a bath of the eutectic alloy.

In some embodiments, the outer surface of the aluminum object is exposed to the eutectic alloy for a first predetermined period, and the eutectic alloy diffuses from the outer surface to the volume of the aluminum object for a second predetermined period. At least a portion of the second predetermined period of time occurs outside of the first predetermined period such that, for example, the first period of time can be less than the second period of time.

In certain embodiments, recovering the eutectic alloy from the surface of the aluminum object includes centrifuging the aluminum object.

In some embodiments, diffusing the eutectic alloy from the outer surface of the aluminum object into the volume of the aluminum object includes diffusing the eutectic alloy along grain boundaries of aluminum alloy of the aluminum object.

In certain embodiments, prior to diffusing the eutectic alloy, the aluminum object is greater than about 87%, by mass, aluminum alloy.

In some embodiments, the aluminum object includes a cold worked aluminum alloy. For example, the cold worked aluminum alloy can be one or more of extruded and forged.

In certain embodiments, the aluminum object includes a high energy grain boundary having an energy greater than about 0.5 J/m2.

In another aspect, a method of fabricating a hydrogen fuel source includes heating a bath of a eutectic alloy of gallium and indium to about 100-200 degrees C., placing an aluminum object with a temperature below 100 degrees C. into the bath, leaving the aluminum object in the bath for a predetermined time, and removing the aluminum object from the bath. The predetermined time is of sufficient duration for the eutectic to penetrate the aluminum oxide layer and wet the grain boundaries substantially throughout the volume of the aluminum object.

In some embodiments, the method further includes recovering at least a portion of the eutectic alloy from an outer surface of the aluminum object, and returning the recovered eutectic alloy to the heated bath. Additionally or alternatively, the method further includes, with the aluminum object removed from the bath, resting the aluminum object.

In certain embodiments, prior to diffusing the eutectic alloy, the aluminum object is greater than about 90%, by mass, aluminum alloy. Additionally or alternatively, the aluminum object can be a sphere.

In still another aspect, a method for manufacturing a hydrogen fuel source includes placing aluminum spheres, at room temperature, into a bath of liquid indium-gallium eutectic alloy heated to above room temperature, stirring the aluminum spheres in the eutectic alloy, removing the aluminum spheres from the bath of the eutectic alloy, and removing at least a portion of the eutectic alloy from an exterior surface of each respective aluminum sphere by one or more of centrifuging, vibrating, or tumbling the aluminum spheres. Each aluminum sphere can have a diameter of about 6 mm.

In yet another aspect, a method of fabricating a hydrogen fuel source includes exposing the aluminum object to a eutectic alloy including gallium, diffusing the eutectic alloy from an outer surface of the aluminum object into a volume of the aluminum object, and recovering at least a portion of the eutectic alloy from the aluminum oxide layer on the outer surface of the aluminum object. The eutectic alloy is diffused through an aluminum oxide layer on an outer surface of the aluminum object. For example, the eutectic alloy is diffused through disruptions in the aluminum oxide layer on the outer surface of the aluminum object. The eutectic alloy can further include indium and/or tin.

In another aspect, a hydrogen fuel source includes an aluminum object having an outer surface defining a volume of the aluminum object, an aluminum oxide layer disposed on the outer surface of the aluminum object, and a eutectic alloy including gallium and indium, the eutectic alloy diffused within the volume of the aluminum object, and at least a portion of the aluminum oxide layer being free of the eutectic alloy and exposed to air.

In some embodiments, a surface area of the portion of the aluminum oxide layer that is free of the eutectic alloy is greater than a surface area of the aluminum oxide layer exposed to air when the hydrogen fuel is in a bath of the eutectic alloy.

In certain embodiments, the diffused eutectic alloy is in a two-phase mixture with the aluminum object.

In some embodiments, the eutectic alloy is greater than zero percent and less than about 3 percent of the combined mass of the eutectic alloy and the aluminum object.

In certain embodiments, the aluminum object is embrittled such that, under tensile or compressive testing, the aluminum object with the eutectic alloy diffused therethrough fractures at a stress less than the yield stress of the aluminum object in the absence of the eutectic alloy.

In some embodiments, the aluminum object includes a cold worked aluminum alloy.

In still another aspect, a method of testing a hydrogen fuel source includes selecting a subset of aluminum objects from a plurality of aluminum objects, applying a mechanical force to each aluminum object in the selected subset; observing the response of each aluminum object in the subset to the applied mechanical force; and sorting the plurality of aluminum objects based on the observed responses of the aluminum objects in the subset. Each aluminum object has an outer surface defining a volume and a eutectic alloy including gallium and indium diffused in the volume.

In some embodiments, applying a mechanical force to each aluminum object in the subset includes fracturing each aluminum object in the subset. The applied mechanical load can be a compressive load or a tensile load.

In certain embodiments, observing the response of each aluminum object in the subset includes determining whether a respective aluminum object in the subset underwent brittle fracture in response to the applied mechanical force. For example, this determination can include comparing a fracture stress of the aluminum object with the eutectic alloy diffused therethrough to the yield stress of the aluminum object in the absence of the eutectic alloy.

In some embodiments, a surface area of the portion of the outer surface of the aluminum object that is free of the eutectic alloy is greater than a surface area of the aluminum oxide layer exposed to air when the hydrogen fuel is in a bath of the eutectic alloy.

Implementations can include one or more of the following advantages.

In certain implementations, at least a portion of the eutectic alloy on the surface of the aluminum object is recovered. Thus, as compared to systems that require the eutectic alloy to be present on the surface of the aluminum during a reaction with water, the activated aluminum fuel of the present disclosure requires only a few atomic layers in the grain boundaries of the aluminum and is, therefore, amenable to a wide range of applications such as, for example, those applications that require portability. This also advantageously permits recovery and re-use of expensive materials used in the activation process that might otherwise remain disposed on the exterior surface of the aluminum.

In certain implementations, because the eutectic alloy is diffused along grain boundaries of the aluminum alloy of the aluminum object, the utility of the aluminum object as a fuel may be significantly less sensitive to composition, as compared to aluminum fuel activated and reacted in a bath of eutectic alloy. For example, the aluminum object, prior to diffusion of the eutectic alloy, can be greater than about 87 percent by mass aluminum alloy and/or can be cold worked or otherwise subject to manipulation resulting in high energy grain boundaries. Accordingly, the methods described herein can be used to convert scrap aluminum of relatively low economic value into an activated aluminum fuel of a higher economic value.

In some implementations, because the eutectic alloy is diffused along grain boundaries of the aluminum alloy of the aluminum object, the utility of the aluminum object as a fuel may be significantly less sensitive to shape, as compared to aluminum fuel activated and reacted in a bath of eutectic alloy. For example, the methods described herein can be used to fabricate stable and high-yielding sources of hydrogen by treating bulk aluminum in any of various different shapes, as well as thin films or sheets of aluminum (e.g., sheets of aluminum having a thickness of greater than about 0.001" to less than about 0.125").

DETAILED DESCRIPTION

Figure 1:
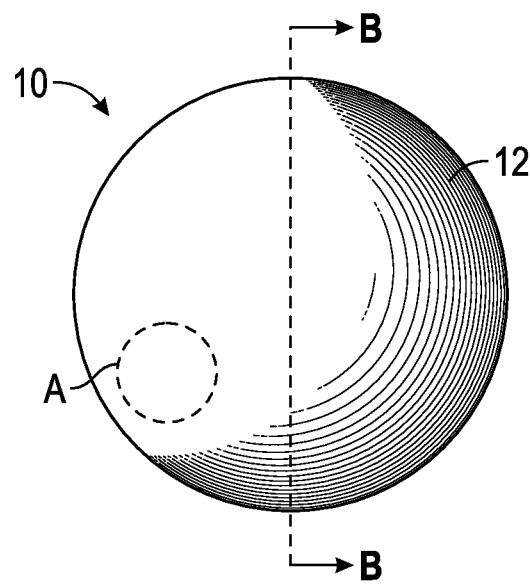
FIG. 1 is a view of an outer surface of an activated aluminum fuel.
Figure 2:
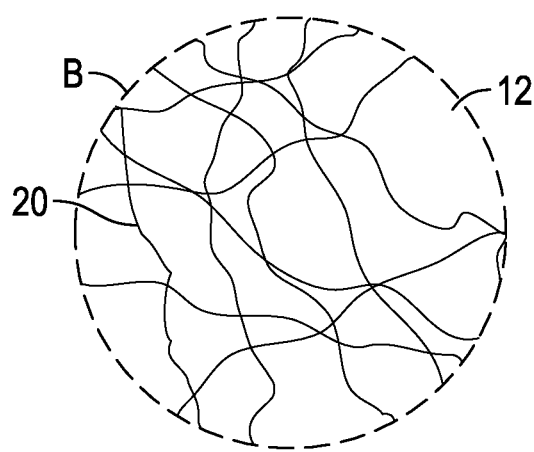
FIG. 2 is a close-up view of the outer surface of the activated aluminum fuel along circle A of FIG. 1.
Figure 3:
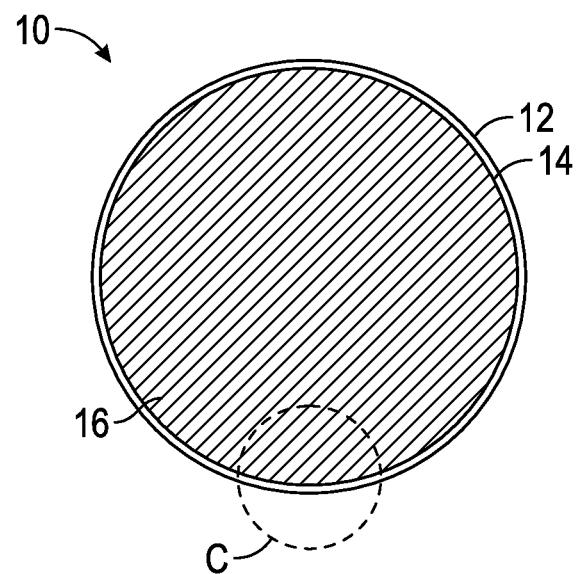
FIG. 3 is a cross-sectional view of the activated aluminum fuel along line B-B of FIG. 1.
Figure 4:
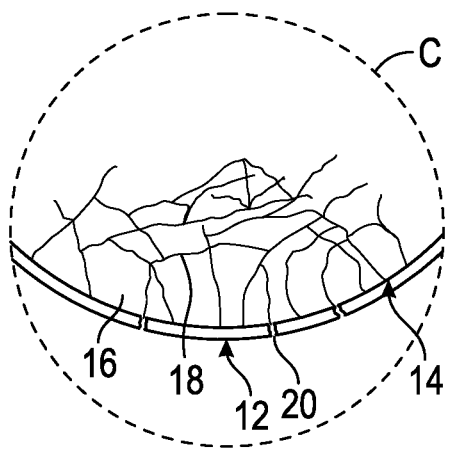
FIG. 4 is a close-up view of the cross-sectional view of the activated aluminum along circle C of FIG. 3.

Referring to FIGS. 1-4, an activated aluminum fuel 10 is a hydrogen fuel source that reacts with water to produce hydrogen and heat. The activated aluminum fuel 10 includes a naturally occurring aluminum oxide layer 12 disposed on an outer surface 14 of an aluminum object 16. As described in further detail below, a gallium-based eutectic alloy (e.g., a eutectic alloy of gallium, gallium-indium, gallium-indium-tin, or gallium-tin) extends through disruptions 20 in the aluminum oxide layer 12 and is diffused within the volume (or bulk) of the aluminum object 16, along eutectic-wetted grain boundaries 18, while at least a portion of the aluminum oxide layer 12 is free of the eutectic alloy and exposed to air. For example, a surface area of the portion of the aluminum oxide layer 12 that is free of the eutectic alloy and exposed to air can be greater than a surface area of the aluminum oxide layer 12 that is exposed to air when the activated aluminum 10 is in a bath of the eutectic alloy (e.g., floating or submerged in a bath of the eutectic alloy). Because the eutectic alloy contained in the activated aluminum fuel 10 is primarily along the eutectic-wetted grain boundaries 18, where the eutectic alloy can be only a few atomic layers thick, much of the eutectic alloy used to prepare the activated aluminum fuel 10 can be recovered. With such a distribution of eutectic alloy primarily along the grain boundaries, the activated aluminum fuel 10 remains substantially stable in air with low humidity. As used herein, the disruptions 20 in the aluminum oxide layer 12 includes, for example, cracks in the aluminum oxide layer and/or nucleation sites on the aluminum oxide layer.

In use, when water is brought into contact with the activated aluminum fuel 10, the water contacts the raw aluminum of the aluminum object 16 via eutectic wetted grain boundaries 18 such that the reaction of the aluminum fuel with water is spatially distributed with respect to the volume of the aluminum object 16. The reaction generates hydrogen and heat and results in significant spalling corrosion which exposes more of the inner bulk of the aluminum object 16 to the water interface, thus increasing the surface area available for the reaction as the reaction progresses. Because the eutectic-wetted grain boundaries 18 extend throughout the volume of the aluminum object 16, the aluminum object 16 may break apart due to this spalling as the reaction with water progresses, exposing more of the aluminum object 16 to the water. Without wishing to be bound by theory, it is believed that this is a result of micro-galvanic cells formed between the aluminum grains (less noble metal) and the surrounding eutectic alloy (more noble metal). When more of these cells come into contact with water (thus completing the circuit) the reaction rate increases. Also, when less water is used the additional heat causes the rate of reaction to increase (roughly an increase of 2× for every 10 degrees C.).

As described in further detail below, the presence of the eutectic alloy along the eutectic wetted grain boundaries 18 while the eutectic alloy is substantially absent from the surface of the aluminum oxide layer 12 provides significant advantages with respect to the cost, transportability, and/or stability that make the activated aluminum fuel 10 a viable fuel for a variety of applications. Also, since the required eutectic alloy in the grains is only a few atoms thick, only a small amount is needed for activation. For example, as compared to an aluminum object having a eutectic alloy on an exterior surface of the aluminum object, the substantial absence of the eutectic alloy from the aluminum oxide layer 12 can result in recycling a higher fraction of the eutectic alloy, thus providing an associated cost reduction. Additionally or alternatively, the reactivity of the activated aluminum fuel 10 with substantial absence of the eutectic alloy from the aluminum oxide layer 12 on the outer surface 14 of the aluminum object 16 demonstrates that the reaction of aluminum and water can be driven with a much smaller amount of eutectic alloy, provided that the eutectic alloy is sufficiently distributed along the eutectic-wetted grain boundaries 18. As another example, as compared to an aluminum object reacted with water in a eutectic bath, the activated aluminum fuel 10 is readily transportable and, therefore, particularly useful for the production of hydrogen on-demand and at the point of power generation.

The aluminum object 16 is spherical and, in certain implementations, has a diameter of less than about 10 mm (e.g., about 6 mm). The spheres can have directional grains, along the surface of the spheres, resulting from extrusion and such directional grains are conducive to grain boundary diffusion into the rest of the aluminum bulk. Additionally or alternatively, the spherical shape can facilitate stirring and other types of manipulation of the aluminum object 16 during processing and usage of the fuel. For example, spheres allow easy pouring of the fuel into containers to be used. In certain implementations, the spherical shape of the aluminum object 16 facilitates handling during manufacture of the aluminum activated aluminum fuel 10. For example, the spherical shape of the aluminum object 16 can facilitate removal of the eutectic alloy from the aluminum oxide layer 12 through any of a variety of mechanical processes including centrifuging, vibrating, and/or tumbling. Additionally or alternatively, as described in further detail below, the low surface area-to-volume ratio of the spherical aluminum object 10 can advantageously reduce corrosion (and the resulting waste of aluminum) that occurs on the outer surface 14 of the aluminum object 10 while the eutectic alloy is diffusing into the volume of the aluminum object 10.

Prior to exposure to the eutectic alloy, the aluminum object 16 may be greater than about 85 percent, by mass, aluminum alloy. For example, the aluminum object 16 can be formed of 7075 T6 aluminum alloy, which is about 87 percent to about 91 percent aluminum alloy by mass. Additionally or alternatively, the aluminum object 16 can be formed of aluminum alloys having a higher percentage of aluminum than the percentage found in 7075 aluminum alloy. The remainder of the mass of the aluminum object 16, prior to exposure to the eutectic alloy, can include impurities. Further, the aluminum alloy of the aluminum object 16 can have misaligned grains and, thus, a high energy grain boundary (e.g., greater than about 0.5 J/m$^2$), such as a grain boundary characteristic of cold worked aluminum.

The plastic deformation that occurs during cold working can advantageously yield more surface cracks and initiation sites on the outer surface 14 of the aluminum object 16, where the eutectic alloy can diffuse into the aluminum object 16, as well as a greater distribution of dislocations and high-angle grain boundaries within the otherwise regular crystalline structure of the aluminum object 16 to facilitate diffusion of a eutectic alloy into and through the interior of the aluminum object 16 during exposure to the eutectic alloy. Cold working, as used herein, includes rolling, bending, shearing, drawing, stamping, forging, extruding, cold shaping, cold forming, and/or otherwise plastically deforming (such that it does not recrystallize the aluminum) the aluminum object 16 prior to exposure to the eutectic alloy.

Accordingly, the activated aluminum fuel 10 can be made from one or more of a variety of aluminum alloys that have been cold worked (or have similar high energy grain boundaries), and the activated aluminum fuel 10 is effective in the presence of impurities. Thus, taken together, it should be appreciated that the aluminum object 16 used to form the activated aluminum fuel 10 can be formed from scrap aluminum such as, for example, the aluminum of recycled beverage cans. As compared to an aluminum fuel that requires tightly controlled processing parameters and/or composition, the activated aluminum fuel 10 can be formed cost-effectively from a variety of aluminum sources, including aluminum with a wide variety of alloys, alloy mixes, compositions, and impurities.

The eutectic alloy may be an indium-gallium eutectic, which is about 22 percent by mass indium and about 78 percent by mass gallium, with the indium percentage varying about 5 percent. In certain implementations, the indium-gallium eutectic additionally includes other metals, such as tin. As described in further detail below, because the activated aluminum fuel 10 includes a small amount of eutectic alloy along the eutectic-wetted grain boundaries 18 and has a surface that is at least partially free of the eutectic alloy, it is desirable to recover eutectic alloy that is not along a grain boundary or otherwise contributing to activation of the activated aluminum fuel 10. Thus, a substantial portion of the eutectic alloy can be recovered from the surface of the activated aluminum fuel 10 during the processing of the activated aluminum fuel 10 and subsequently recycled for further use in the process.

The diffused eutectic alloy in the eutectic wetted grain boundaries 18 of the aluminum object 16 may be in a two-phase mixture with the aluminum object. The presence of the eutectic wetted grain boundaries 18 allows the aluminum object 16 to react slowly, remaining substantially stable, in low-humidity, oxygen environments, but to be highly reactive in water. Thus, presence of the eutectic alloy along the eutectic wetted grain boundaries 18 facilitates use of the activated aluminum fuel 10 outside of a bath of the eutectic alloy, lending itself to stability and portability of the activated aluminum fuel 10. For example, the activated aluminum fuel 10 can be reacted in the field, away from the location in which the activated aluminum fuel 10 was prepared. Additionally or alternatively, where the eutectic alloy is disposed along the eutectic wetted grain boundaries 18 while being substantially absent from the aluminum oxide layer 12 on the outer surface 14 of the aluminum object 16, the eutectic alloy is efficiently distributed throughout the activated aluminum fuel 10.

In certain implementations, the eutectic alloy comprises greater than 0 percent but less than about 3 percent of the total mass of the activated aluminum fuel 10. The activated aluminum fuel 10 can yield between 80-95 percent 3 percent of the theoretically expected hydrogen yield, demonstrating that the activated aluminum fuel 10 is a highly efficient source of hydrogen while containing low concentrations of the eutectic alloy. Given the cost of the eutectic alloy, the efficient distribution of the eutectic alloy within the activated aluminum fuel 10 combined with the ability to recycle substantial amounts of the gallium eutectic alloy can be important for the economic viability of the activated aluminum fuel 10.

The presence of the gallium-containing eutectic alloy along the eutectic wetted grain boundaries 18 results in liquid metal induced embrittlement of the aluminum object 16. Such embrittlement is observed as a change in the response of the aluminum object 16 to mechanical stress (e.g., tensile stress and/or compressive stress), as compared to the response of the material of the aluminum object 16 prior to exposure to the gallium-containing eutectic alloy. For example, the aluminum object 16 with sufficient eutectic alloy diffused along the eutectic wetted grain boundaries 18 will undergo brittle fracture, precipitated by intergranular fracture, failing at a stress less than the yield stress of the material of the aluminum object, upon exposure to tensile or compressive stress, whereas, prior to exposure of the aluminum object 16 to the eutectic alloy, the material of the aluminum object 16 would be ductile and fail at the yield stress.

The embrittlement of the aluminum object 16 serves as a useful predictor for the quality of the activated aluminum fuel 10 as a fuel source because it is related to the degree of diffusion of the eutectic alloy into the aluminum fuel, and because advantageous for the aluminum object 16 to break apart as the reaction with water progresses. For example, previous systems that used bulk structures inherently would not break apart so readily, which then prevented the desired rapid generation of hydrogen. That is, the bodies tended not to break apart, but a protective oxide would reform and deter the production of additional hydrogen, even with a substantial mass of unreacted aluminum. Thus, as described in further detail below, the embrittlement of the aluminum object 16 can serve as a useful test for determining whether a sufficient amount of eutectic alloy has diffused within the aluminum object 16 such that the activated aluminum fuel 10 will act as a useful source of hydrogen.

The aluminum oxide layer 12 forms on the outer surface 14 of the aluminum object 16 when the aluminum object 16 is in air. The aluminum oxide layer 12 is stable and prevents water from reacting with un-oxidized aluminum of the aluminum object 16 beneath the aluminum oxide layer 12. However, the aluminum oxide layer 12 may include disruptions 20 that facilitate penetration of the eutectic alloy into the volume of the aluminum object 16. As used herein, disruptions 20 include, for example, micro-cracks and/or nucleation sites. In use, the disruptions 20 facilitate corresponding water penetration into the aluminum object 16, along the wetted eutectic grain boundaries 18, such that the water can react with un-oxidized aluminum underneath the native surrounding aluminum oxide layer 12.

Figure 5:
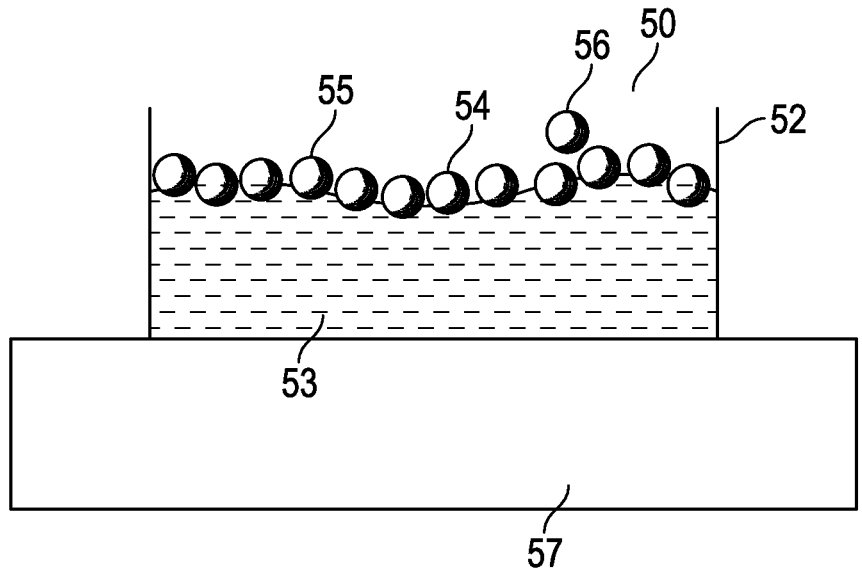
FIG. 5 is a schematic diagram of a system for treating discrete aluminum objects with a eutectic alloy to form an activated aluminum fuel.

Referring now to FIG. 5, an exemplary treatment system 50 that can be used to fabricate activated aluminum fuel (e.g., the activated aluminum fuel 10 of FIGS. 1-4) includes a treatment bath 52, containing a eutectic alloy 53, discrete aluminum objects 54, 55, and 56, and a heater 57. The treatment bath 52 may be disposed on the heater 57. In use, the discrete aluminum objects 54, 55, and 56 may be heated to a temperature between 100-200 degrees C., and the discrete aluminum objects 54, 55, and 56 may be stirred to move the discrete aluminum objects 54, 55, and 56 to different levels of submersion within the treatment bath 52 to ensure proper wetting of the aluminum objects 54, 55, and 56. As described in further detail below, the time that the aluminum objects 54, 55, and 56 are exposed to the eutectic alloy 53 in the treatment bath 52 is a parameter that may be controlled to balance the competing physical processes of diffusion of the eutectic alloy 53 into the volume of the aluminum objects 54, 55, and 56 and corrosion of the surface of the aluminum objects 54, 55, and 56 by the eutectic alloy 53.

Figure 6:
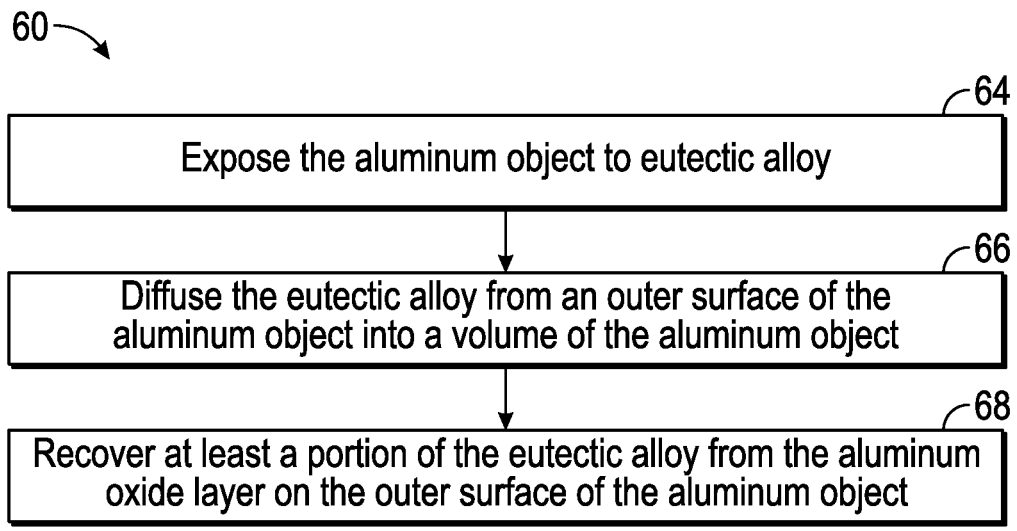
FIG. 6 is a flow chart of a process for treating discrete aluminum objects using the system of FIG. 5 to form activated aluminum fuel.

Referring to FIG. 6, an exemplary method 60 of fabricating a hydrogen fuel source includes exposing 64 the aluminum object to a eutectic alloy, diffusing 66 the eutectic alloy from an outer surface of the aluminum object into a volume of the aluminum object, and recovering 68 at least a portion of the eutectic alloy from the aluminum oxide layer on the surface of the aluminum object. Each step in the exemplary method 60 is described in further detail below. It should be appreciated that the exemplary method 60 can be used to fabricate, for example, the activated aluminum fuel 10 (FIGS. 1-4) using the treatment system 50.

Exposing 64 the aluminum object to the eutectic alloy can include placing the aluminum object in a bath of the eutectic alloy, which can be an indium-gallium eutectic alloy. For example, multiple aluminum objects can be immersed in the bath of the eutectic alloy in a batch process, and the bath can be stirred to ensure that the entire surface of the aluminum object comes into contact with the eutectic alloy. However, it should be appreciated that exposing 64 the aluminum object to the eutectic alloy can, additionally or alternatively, include coating the aluminum object with a layer of eutectic alloy and later removing this coating via a centrifuging process after treatment.

The duration of the exposure 64 may be controlled such that the eutectic alloy has sufficient time to penetrate disruptions in the aluminum oxide layer on the aluminum object. Additionally, the duration of the exposure 64 may be controlled such that it is not long enough to allow the eutectic alloy in the bath to corrode significant amounts of the aluminum oxide layer and the aluminum object and, therefore, reduce the yield of the activated aluminum fuel. A suitable intermediate duration may depend on a variety of factors including, without limitation, the object size, the object geometry, the object mass, the object temperature, bath temperature, ambient temperature, and so forth. For example, it has been found that placing a spherical aluminum object having a nominal diameter of 6 mm in the bath of the eutectic alloy for greater than about 90 minutes and less than about 180 minutes (e.g., about 120 minutes) balances the competing considerations of sufficient penetration time and corrosion.

In certain implementations, the bath of the eutectic alloy is heated above the temperature of the aluminum object, and the lower temperature aluminum object can be placed into the heated bath. For example, the aluminum object can be below 100 degrees C. and placed into the bath of the eutectic alloy, which has been heated to about 100-200 degrees C. Placing the aluminum object in a heated bath can, in certain instances, result in simultaneous expansion of the aluminum object sufficient to create disruptions in the aluminum oxide layer and exposure 64 of the aluminum object to the eutectic alloy through the disruptions in the aluminum oxide layer.

As the aluminum object is exposed 64 to the eutectic alloy, the eutectic alloy may begin to diffuse 66 into the aluminum object through the disruptions in the aluminum oxide layer. Over time, the eutectic alloy may move in a direction from the outer surface of the aluminum object and into the grain boundaries (e.g., eutectic wetted grain boundaries 18 in FIGS. 1-4) in the volume of the aluminum object. The diffusion 66 of the eutectic alloy may occur (e.g., through capillary action) along the grain boundaries of the aluminum object until the eutectic alloy is diffused substantially throughout the aluminum object. In view of the diffusion process, symmetry (e.g., in the form of a sphere) of the aluminum object can be advantageous for producing a relatively uniform distribution of the eutectic alloy throughout the volume of the aluminum object.

While the diffusion 66 of the eutectic alloy into the aluminum oxide begins upon exposure 64 of the eutectic alloy to the aluminum object, the diffusion 66 may also continue after the aluminum object has been removed from the eutectic alloy. Thus, exposure 64 of the aluminum object can occur over a first predetermined period, and the diffusion 66 of the eutectic alloy into the volume of the aluminum object can occur over a second predetermined period, which may overlap with or be independent of the exposure window. In general, the second predetermined period is a resting period, during which the aluminum object is not yet optimally suited for use as a source of hydrogen, and at least a portion of the second predetermined period may occur outside of the first predetermined period, e.g., after the object is no longer exposed to the eutectic alloy. Further, in view of the competing processes of diffusion into the volume of the aluminum object and corrosion on the surface of the aluminum object, the first predetermined period may advantageously be less than the second predetermined period. For example, the first predetermined period associated with the exposure 64 can be about 20 minutes to about 180 minutes (e.g., about 120 minutes), while the second predetermined period is at least about 24 hours.

In certain implementations, the aluminum object may be thermally expanded to exploit the difference in the respective coefficients of thermal expansion of the aluminum object and the aluminum oxide layer formed on the outer surface of the aluminum object. The coefficients of thermal expansion for aluminum and aluminum oxide are $2.22 \times 10^{-5}$ m/(m/K) and $5.4 \times 10^{-6}$ m/(m/K), respectively. Thus, given that the aluminum object has a greater coefficient of thermal expansion than that of the surrounding aluminum oxide layer, thermal expansion of the aluminum object can create stress in the aluminum oxide layer (which does not expand as readily as aluminum expands) in excess of the tensile strength of the aluminum oxide layer (e.g., resulting in brittle fracture) to form disruptions in the aluminum oxide layer. Under suitable conditions, this expansion of the aluminum object beyond the tensile strength of the aluminum oxide layer can produce a plurality of disruptions in the aluminum oxide layer.

Given variations in composition of the aluminum object afforded by the methods of the present disclosure, heating the aluminum object to greater than about 30 degrees C. above an initial temperature (e.g., greater than about 75 degrees C. above an initial temperature) of the aluminum object is believed to be sufficient to disrupt the aluminum oxide layer (e.g., by inducing brittle fracture). For example, a temperature increase of 135 degrees C. (e.g., from 25 degrees C. to 160 degrees C.) can cause stress in the aluminum oxide layer in excess of the tensile strength of the aluminum oxide layer such that the aluminum oxide layer is physically disrupted. It should be appreciated, however, that other temperature differences sufficient to disrupt the aluminum oxide layer may also or instead be used, and are within the scope of the present disclosure. The melting temperature of the aluminum object represents an upper boundary on the amount of heat that can be applied to the aluminum object to disrupt the aluminum oxide layer. It should be further appreciated that other methods of disrupting the aluminum oxide layer (e.g., the creation of nucleation sites on the aluminum oxide layer) are within the scope of the present disclosure.

Recovering 68 at least a portion of the eutectic alloy from the outer surface of the aluminum oxide layer may include removing the aluminum object from the bath of the eutectic alloy and, in certain implementations, allowing the aluminum object to cool. With the aluminum object removed from the bath of the eutectic alloy and optionally cooled, recovering 68 the eutectic alloy can include mechanically removing a substantial portion of the eutectic alloy from the surface of the aluminum object such that at least a portion of a surface area of the aluminum object is free of the eutectic alloy and exposed to air. A loose layer of aluminum oxide or aluminum hydroxide will cover the underlying aluminum from reacting significantly if kept in air for short periods of time. Examples of mechanically removing the eutectic alloy from the surface of the aluminum object include one or more of centrifuging, vibrating, or tumbling.

Substantially uniformly shaped aluminum objects, such as spherical aluminum objects, can offer advantages with respect to the removal of the eutectic alloy. For example, as compared with shapes that are irregularly shaped and/or have a high surface energy (e.g., aluminum chips), the eutectic alloy can be more easily and effectively removed from the surface of a spherical aluminum object with a slightly polished surface. Thus, in certain implementations, recovering 68 a substantial portion of the eutectic alloy is achieved by centrifuging aluminum spheres, having a nominal diameter of 6 mm, at about 6000 rpm for about 30 seconds.

Given the cost associated with the eutectic alloy, recovering 68 the eutectic alloy can accrue substantial economic benefits, and may include returning the eutectic alloy to the bath for subsequent processing of additional aluminum objects. Because a substantial portion of the eutectic alloy is recovered 68, the amount of eutectic alloy consumed in fabricating the activated aluminum fuel corresponds approximately to the eutectic alloy along the grain boundaries of the volume of the aluminum object.

In one example of the use of the exemplary method 60 to fabricate a hydrogen fuel source, 6 mm diameter aluminum spheres having greater than 99 percent aluminum content, by mass, were treated with an indium-gallium eutectic alloy to create an activated aluminum fuel according to the following process. A bath of the indium-gallium eutectic alloy was placed on a hot plate, and heated with the hot plate temperature at 150 degrees C. The 6 mm spheres, at room temperature, were placed in the heated bath of the eutectic alloy and stirred for 30 minutes. The 6 mm spheres were then removed from the heated bath of the eutectic alloy and centrifuged at 6000 rpm for 30 seconds. The 6 mm spheres were then allowed to rest for 48 hours to achieve an appropriate amount of diffusion of the eutectic alloy within the 6 mm spheres.

In another example, 6 mm spheres were treated according to the same process described with respect to the previous example, except the eutectic alloy used was an indium-gallium-tin eutectic alloy.

The activated aluminum fuel resulting from treatment according to the previous examples yielded between 80-95 percent 3 percent of the theoretically expected hydrogen yield. It should be appreciated that the amount of hydrogen yield observed from the reaction of an activated aluminum fuel with water can be impacted by variables such as reaction temperature between water and the activated aluminum fuel, quantity of water present during the reaction with the activated aluminum fuel, and type of water (e.g., distilled water versus tap water).

Figure 7:
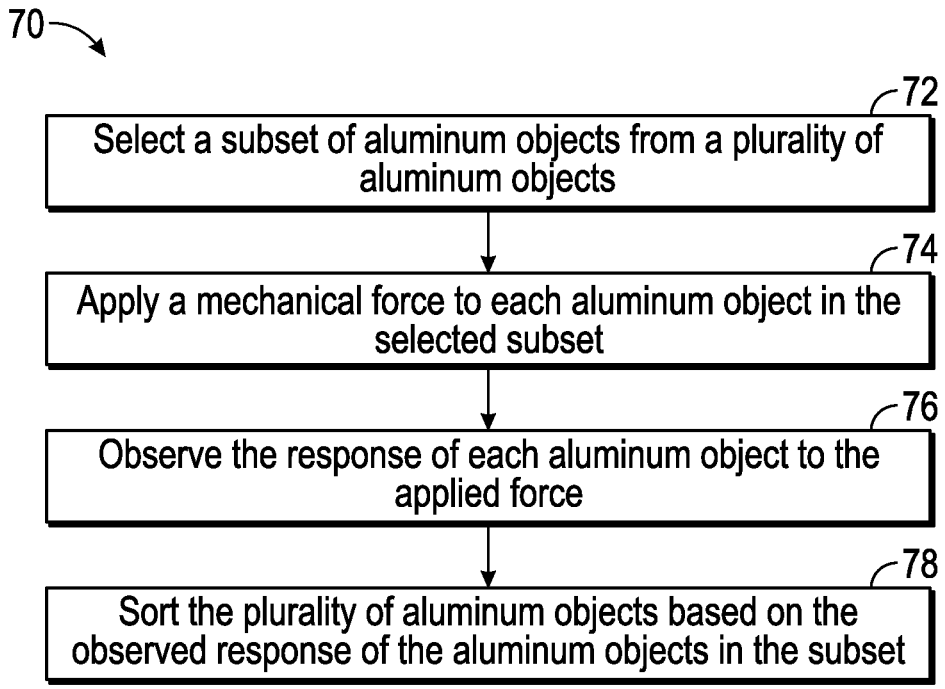
FIG. 7 is a flow chart of a process for testing discrete aluminum objects treated according to the process of FIG. 6.

Referring now to FIG. 7, an exemplary test method 70 for determining the suitability of an activated aluminum fuel as a source of hydrogen includes selecting 72 a subset of aluminum objects from a plurality of aluminum objects, applying 74 a mechanical force to each aluminum object in the selected subset, observing 76 the response of each aluminum object to the applied force, and sorting 78 the plurality of aluminum objects based on the observed response of the aluminum objects in the subset. Each aluminum object has an outer surface defining a volume, a eutectic alloy including gallium and indium diffused in the volume, and at least a portion of the outer surface free of the eutectic alloy. In this context, it is expressly contemplated that there may be some residue of eutectic alloy on the outer surface according to the effectiveness and aggressiveness of recovery efforts, although preferably the recovery process will include removing as much of the eutectic as possible without otherwise impacting the mass, stability or useability of the aluminum fuel. In this context, the exemplary test method 70 can be used to determine whether an aluminum object treated according to the exemplary method 60 (FIG. 6) will produce a high yield of hydrogen and, therefore, can be a useful for quality assurance.

Selecting 72 the subset of aluminum objects from the plurality of aluminum objects can include selecting the subset from a group of aluminum objects made in the same batch such that the test results of the subset can form at least part of the basis for accepting or rejecting the batch. The number of aluminum objects in the subset can vary and, in certain implementations, depends on the statistical certainty required for a particular application. Thus, the subset of aluminum objects can be any number, provided that the subset is less than the plurality of aluminum objects from which the subset is selected. In certain implementations, the selection 72 of the subset of aluminum objects from the plurality of aluminum objects is random. In some implementations, the selection 72 of aluminum objects from the plurality of aluminum objects can be based on the visual appearance of the aluminum objects.

Applying 74 a mechanical force to each aluminum object in the subset of aluminum objects includes applying a tensile load and/or a compressive load to each aluminum object. For example, where the aluminum objects are spherical, the application 74 of mechanical force may include application of a compressive load. The amount of the mechanical force may be selected so that it is sufficient to observe brittle fracture of an appropriately embrittled aluminum object. In certain implementations, the mechanical force is limited to a force or range of forces below the yield strength of untreated aluminum. In some implementations, the mechanical force is increased until the tested aluminum object undergoes mechanical failure.

Observing 76 the response of each aluminum object to the applied mechanical force includes determining whether the aluminum object underwent brittle fracture. For example, the determination of whether the aluminum object underwent brittle fracture can be based on a comparison of the stress at which the fracture occurred to the yield stress of an untreated aluminum reference material (e.g., the same aluminum material used in the treated aluminum object). For example, if the tested aluminum object undergoes brittle fracture at a stress that is less than the yield stress of an untreated aluminum reference material, the tested aluminum object can be categorized as having undergone embrittlement as contemplated herein.

Sorting 78 the plurality of aluminum objects based on the observed response of the aluminum objects in the subset to the applied force includes separating the aluminum objects that correspond to lots in which brittle fracture was observed and those in which brittle fracture was not observed. Accordingly, the sorting 78 of the plurality of aluminum objects can serve as a final step in a quality assurance process. In some implementations, the lots in which brittle fracture was not observed can be subjected to additional treatment with the eutectic alloy. In another aspect, sorting 78 may include sorting the aluminum objects into a plurality of ranges or bins according to the applied force at which brittle fracture was observed.

Figure 8A:
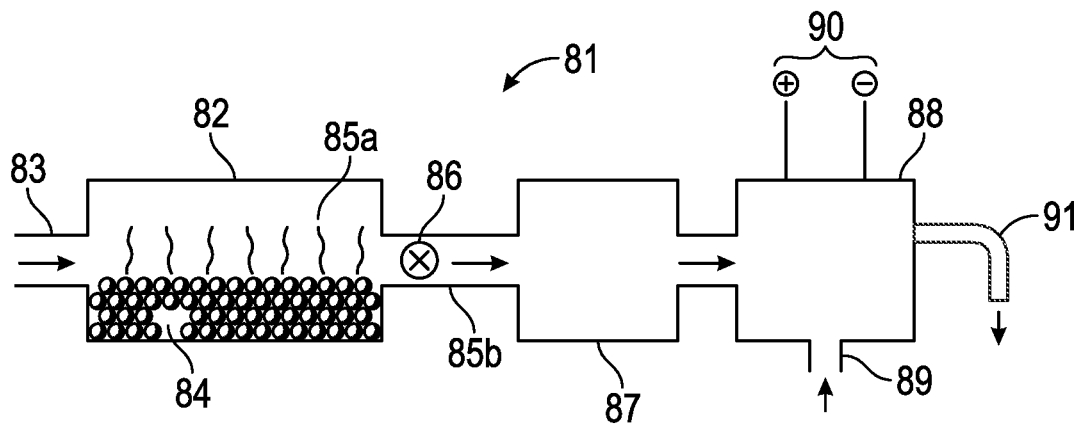
FIG. 8A is a schematic diagram of a hydrogen-oxygen powered system in which activated aluminum fuel is within a reactor.
Figure 8B:
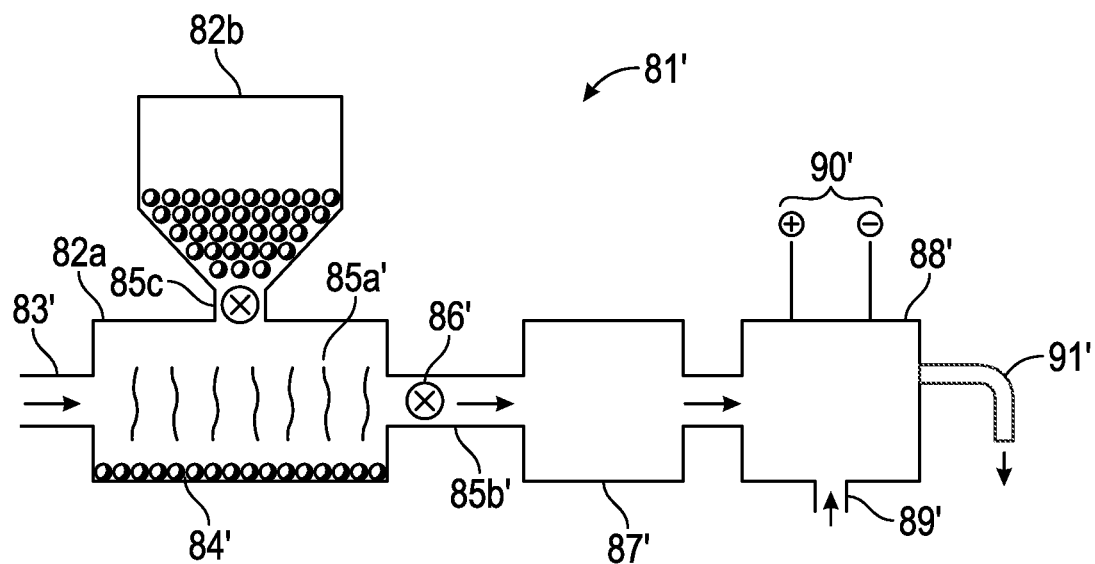
FIG. 8B is a schematic diagram of a hydrogen-oxygen powered system in which activated aluminum fuel is fed into a reactor via a hopper mechanism.
Figure 8C:
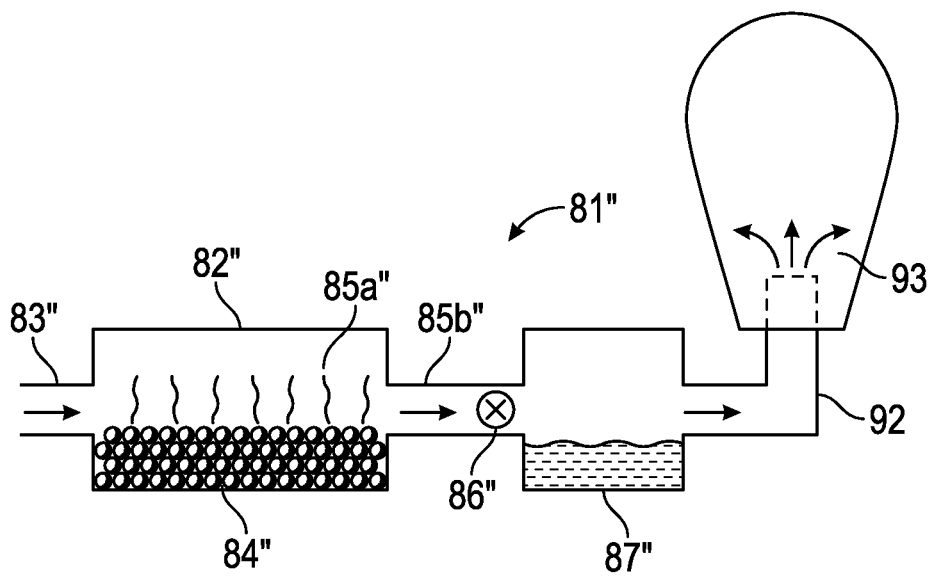
FIG. 8C is a schematic diagram of a hydrogen generation system used to fill a structure.

Referring now to FIGS. 8A-8C, activated aluminum fuel (e.g., the activated aluminum fuel 10 of FIGS. 1-4) can be combined with water to create hydrogen on-demand in a hydrogen-powered system. As compared to the challenges of storing and/or transporting hydrogen, the activated aluminum fuel can be safely and easily stored and transported to the hydrogen-powered system, making it amenable to use in a wide variety of hydrogen-powered systems.

Referring to FIG. 8A, a reaction system 81 is capable of reacting activated aluminum fuel with water. A reaction chamber 82 houses the treated discrete aluminum objects 84. A water inlet 83 allows mediated amounts of water into the reaction chamber 82 for reaction with the treated aluminum objects 84. Steam 85a is generated and will reach the other parts of the treated aluminum objects 84. A hydrogen outlet 85b houses a check valve 86 to control the flow of hydrogen and steam out of the reaction chamber 82. Because the steam 85a can cause fuel cells to fail, the steam 85a is run through a condenser 87 before being directed to a fuel cell 88. The fuel cell 88 also has an oxygen inlet 89 from an oxygen source such as, for example, an oxygen candle. Electric leads 90 provide electricity to a system like an autonomous underwater vehicle and an exhaust 91 for water leads from the fuel cell 88.

Referring to FIG. 8B, a reaction system 81' is similar to the reaction system 81. Thus, unless otherwise indicated, an element designated with a primed (') element number in FIG. 8B is similar to a corresponding element designated with an unprimed element number in FIG. 8A. The reaction system 81' is capable of producing electricity through the introduction of treated discrete aluminum objects 84' into a hopper mechanism 82b and subsequent introduction into a reaction chamber 82a via a feeding mechanism 85c.

Referring to FIG. 8C, unless otherwise indicated, an element designated with a double primed (") element number in FIG. 8C is similar to a corresponding element designated with an unprimed element number in FIG. 8A. The reaction system 81" is similar to the reaction system 81, except that the generated hydrogen is instead flowed through piping 92 to an inflatable structure 93 such as, for example, a weather balloon.

While certain implementations have been described, other implementations are possible.

For example, while the activated aluminum fuel has been described as being spherical, other shapes are additionally or alternatively possible. For example, the aluminum objects can be in the form of one or more of a bar, a rectangular prism, a thin plate, and a cylinder. Additionally or alternatively, the aluminum object can be a cold formed or a cast shape.

Figure 9A:
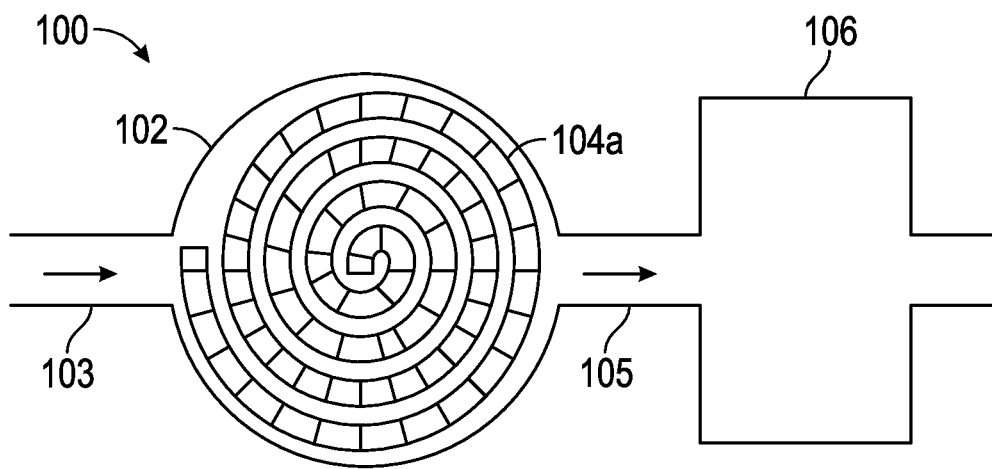
FIG. 9A is a schematic diagram of a hydrogen generation system for a fuel cell, in which a treated coiled strip of activated aluminum fuel is reacted.
Figure 9B:
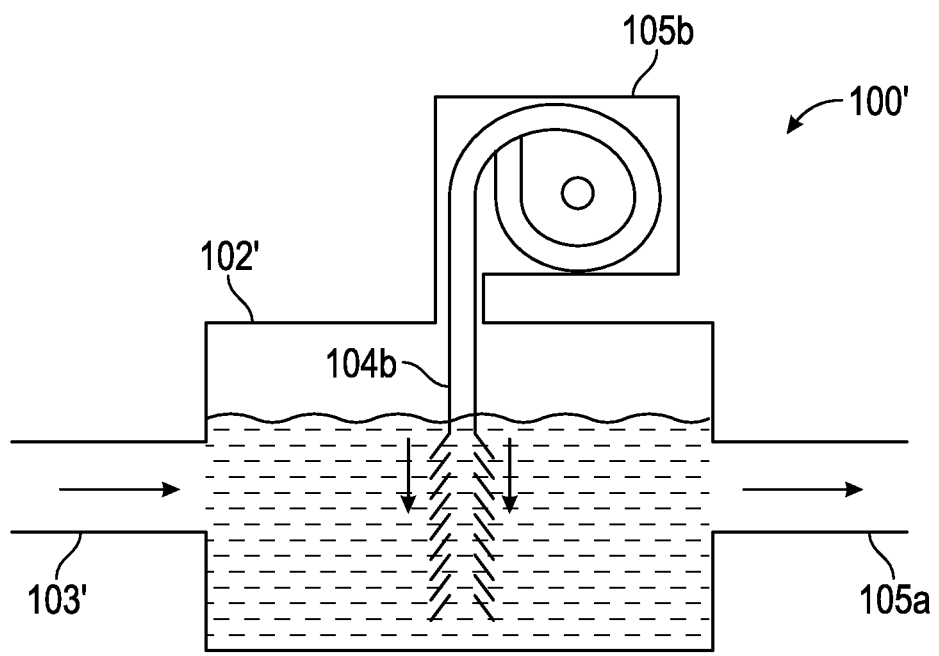
FIG. 9B is a hydrogen generation system for a fuel cell, in which a spooled wire of activated aluminum fuel reacts in a reactor.
Figure 9C:
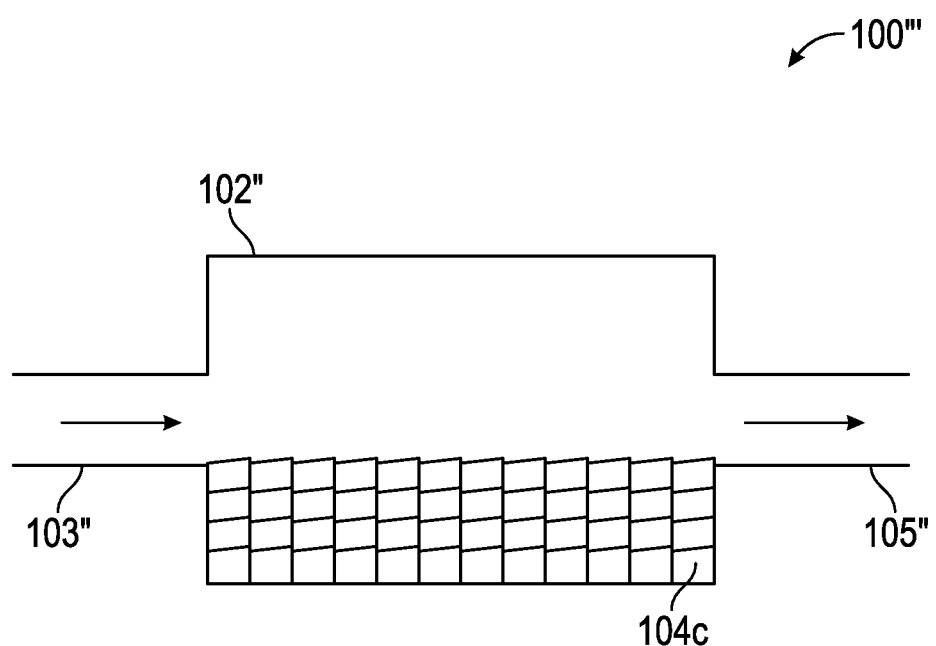
FIG. 9C is a hydrogen generation system for a fuel cell, in which activated aluminum fuel in the shape of rectangular prisms is reacted in a reactor.

Referring now to FIGS. 9A-9C, the shape of the activated aluminum fuel can be tied to the design of a reactor in which water is introduced to the activated aluminum fuel and hydrogen is produced.

Referring now to FIG. 9A, a hydrogen generation system 100 includes a coiled strip of treated aluminum 104a housed in a reactor 102. A water inlet 103 provides metered amounts of water to the fuel. Generated hydrogen and steam are sent through an outlet 105, where the steam is then condensed in a condenser 106. This hydrogen can then be used for power generation in a fuel cell or to fill a lighter-than-air structure.

Referring now to FIG. 9B, a hydrogen generation system 100' is similar to the hydrogen generation system 100 in FIG. 9A. Thus, unless otherwise, indicated an element designated with a primed (') element number in FIG. 9B is similar to a corresponding element designed with an unprimed element number in FIG. 9A. The hydrogen generation system 100 includes a treated aluminum wire 104b which is fed into a reactor 102' via a spool of treated aluminum wire 105b. Steam and hydrogen are then sent through an outlet 105a to a condensing system, similar to the condensing system shown in FIG. 9A, to provide pure hydrogen.

Referring now to FIG. 9C, a hydrogen reaction system 100" is similar to the hydrogen reaction system 100 in FIG. 10a. Thus, unless otherwise indicated, an element designated with a double primed (") element number in FIG. 9C is similar to a corresponding element designated with an unprimed element number in FIG. 9A. The hydrogen generation system 100" includes treated rectangular prisms 114c housed in a reactor 112". A water inlet 113" provides metered amounts of water to the treated rectangular prisms 114c to react. Steam and hydrogen are then sent through a condensing system, similar to the condensing system shown in FIG. 10A, to provide pure hydrogen.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

What is claimed is:

1. A kit of material comprising:
    at least one cold worked aluminum object having a surface defining a volume, the surface including an aluminum oxide layer, and the at least one cold worked aluminum object including a plastically deformed and non-recrystallized aluminum alloy having misaligned grains defining grain boundaries;
    a container heatable to a temperature not more than about 200° C.; and
    a eutectic alloy including indium and gallium, the eutectic alloy disposed in the container and separate from the at least one cold worked aluminum object,
    wherein,
        within the container, the eutectic alloy is introducible into the grain boundaries of the plastically deformed and non-recrystallized aluminum alloy, via disruptions in the aluminum oxide layer of the surface of the at least one cold worked aluminum object, with the eutectic alloy concentrated along the grain boundaries of the plastically deformed and non-recrystallized aluminum alloy to form activated aluminum, and
        the at least one cold worked aluminum object and the eutectic alloy are in relative amounts combinable to form the activated aluminum having greater than zero percent and less than about 3 percent of the eutectic alloy by mass and reactive with water to yield greater than about 80 percent and less than about 95 percent of a theoretical yield of hydrogen.

2. The kit of material of claim 1, wherein the at least one cold worked aluminum object has a dimension less than 10 mm.

3. The kit of material of claim 1, wherein the at least one cold worked aluminum object is a wire.

4. The kit of material of claim 1, wherein the at least one cold worked aluminum object includes a plurality of discrete bodies.

5. The kit of material of claim 1, wherein each discrete body is at least one of a sphere, a bar, a prism, a thin plate, a cylinder.

6. The kit of material of claim 1, wherein the plastically deformed and non-recrystallized aluminum alloy is at least 87 percent aluminum by mass.

7. The kit of material of claim 1, wherein the eutectic alloy is combinable with the at least one cold worked aluminum object in the container via heat applied to the container.

8. The kit of material of claim 1, wherein the at least one cold worked aluminum object includes directional grains.

9. The kit of material of claim 8, wherein the eutectic alloy is about 20 percent by mass indium and about 80 percent by mass gallium.

10. The kit of material of claim 9, wherein the eutectic alloy further includes tin.

11. A kit of material comprising:
   at least one cold worked aluminum object including a plastically deformed and non-recrystallized aluminum alloy; and
   a gallium-containing eutectic alloy, the gallium-containing eutectic alloy separate from the at least one cold worked aluminum object, the at least one cold worked aluminum object and the gallium-containing eutectic alloy in relative amounts combinable to form activated aluminum with greater than zero percent and less than 4 percent of the eutectic alloy by mass.

12. The kit of material of claim 11, wherein the at least one cold worked aluminum object has a dimension less than 10 mm.

13. The kit of material of claim 11, wherein the at least one cold worked aluminum object is a wire.

14. The kit of material of claim 13, wherein the wire is spooled.

15. The kit of material of claim 11, wherein the at least one cold worked aluminum object includes a plurality of discrete bodies.

16. The kit of material of claim 15, wherein each discrete body is at least one of a sphere, a bar, a prism, a thin plate, a cylinder.

17. The kit of material of claim 11, wherein the plastically deformed and non-recrystallized aluminum alloy is at least 87 percent aluminum by mass.

18. The kit of material of claim 17, the plastically deformed and non-recrystallized aluminum alloy is 7075 aluminum alloy.

* * * * *